E. T. REYNOLDS.
VEHICLE WHEEL TIRE FILLER.
APPLICATION FILED MAR. 23, 1917.

1,259,290.

Patented Mar. 12, 1918.
2 SHEETS—SHEET 1.

WITNESSES

INVENTOR
Edgar T. Reynolds
BY
ATTORNEYS

E. T. REYNOLDS.
VEHICLE WHEEL TIRE FILLER.
APPLICATION FILED MAR. 23, 1917.

1,259,290.

Patented Mar. 12, 1918.

WITNESSES

INVENTOR
Edgar T. Reynolds
BY
ATTORNEYS

UNITED STATES PATENT OFFICE.

EDGAR T. REYNOLDS, OF BROOKLYN, NEW YORK.

VEHICLE-WHEEL-TIRE FILLER.

1,259,290.

Specification of Letters Patent. Patented Mar. 12, 1918.

Application filed March 23, 1917. Serial No. 156,855.

*To all whom it may concern:*

Be it known that I, EDGAR T. REYNOLDS, a citizen of the United States, and a resident of the city of New York, borough of Brooklyn, in the county of Kings and State of New York, have invented a new and Improved Vehicle-Wheel-Tire Filler, of which the following is a full, clear, and exact description.

Among the principal objects which the present invention has in view are: To obtain pneumatic resiliency without abnormal compression of air within the tire; to localize the cushioning effect of the tire to that portion bearing the weight of the vehicle for maintaining a normal supply of air to the filler; and to utilize the combined resiliency of the material from which the filler is constructed and air with which the filler is supplied.

*Drawings.*

*Description.*

Figure 1:
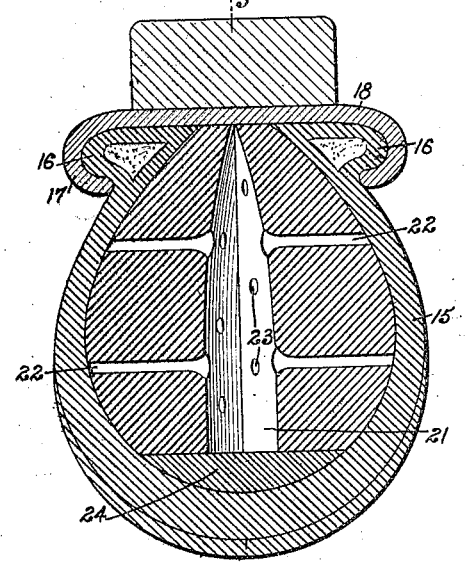
Figure 1 is a cross section of a shoe, wheel rim, and felly having applied as in service a filler constructed and arranged in accordance with the preferred form of the invention.

As seen in the drawings, the conventional tire shoe 15 is employed in the present invention, the beads 16 thereof being held by the overturned edges 17 of the tire rim 18. As seen in Fig. 1 of the drawings, the beads 16 are contracted to be held in the rim 18 between the edges 17 thereof.

Figure 2:
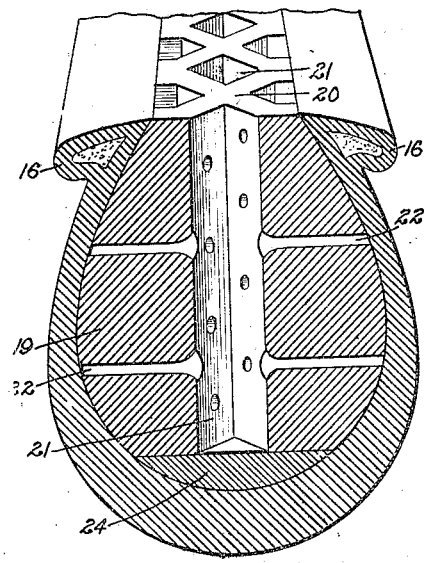
Fig. 2 is a similar view showing the shoe and filler as removed from the rim and felly of the wheel.
Figure 3:
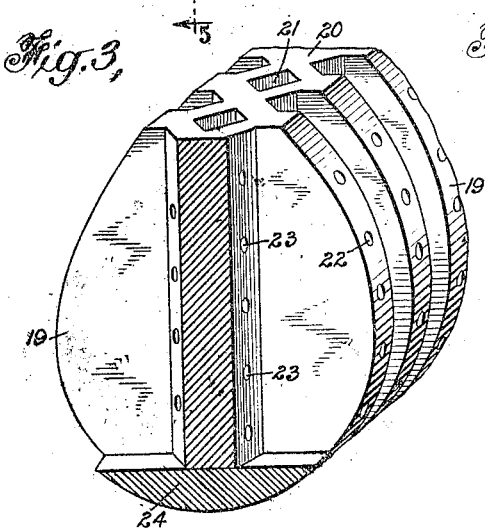
Fig. 3 is a detail view in perspective showing a fragment of the filler.

In lieu of the compressed air usually employed for maintaining the shape of the shoe 15 and for supporting the load carried by the wheel, there is herein employed a circular filler. The preferred form of the present filler, as shown in Figs. 1 to 3, inclusive, and Fig. 5 of the drawings, is constructed from resilient material, such as rubber, and has a series of lateral walls 19. The walls 19 are integral with a central web structure 20. The web structure 20 is pierced perpendicularly by passages 21. The vertical sides of the web structure 20 conform to the shape of the passages 21 and the partition walls 19 connect with the said web structure at the outer extremities of the projections on the said web structure. The partition walls 19 are horizontally perforated to form passages 22. The vertical walls forming the passages 21 are perforated to form passages 23. The passages 22 and 23 constitute limited communication for the cellular spaces formed between the walls 19 and within the passages 21.

In the preferred form of the tire, the inner terminus of each passage 21 is sealed by the rim 18, while the outer terminus of each of said passages is closed by a fillet 24. The fillet 24 is constructed of solid rubber and has a curved surface which complements the curvature of the outer edges of the walls 19. The shape of the combined filler and fillet 24 prior to the shoe 15 being compressed is shown best in Figs. 2 and 3 of the drawings.

When the beads 16 of the shoe are contracted for disposition between the edges 17 of the rim 18, the inner ends of the passages 21 and of the spaces between the walls 19 and the inner surface of the shoe 15, are contracted to partially close the same. The effect of the contraction of the beads 16 upon the passages 21 is shown best in Fig. 1 of the drawings. The mechanical compression of the filler at this point materially assists in sealing the passages 21 and spaces between the walls 19. In service, said passages and spaces are further sealed by the compressive action of the wheel and load carried thereby, on the tire shoe and filler thereof.

When a filler constructed and arranged as above described is disposed for service in a shoe 15, the operation is as follows:

As each successive section of the wheel is pressed between the wheel rim and the ground, the resilient walls 19 and web structure 20 yield in correspondence with the flattening of the tire. The air contained in the spaces between the walls 19, in the passages 21, and in the passages 22 and 23 is compressed. The displacement of the material forming the filler in the manner indicated seals the ends of said passages and partially imprisons the air held therein. The resiliency resulting from this action is therefore partly due to the elasticity of the material of which the filler structure is formed and partly from the elasticity of the air trapped in the said passages.

Figure 4:
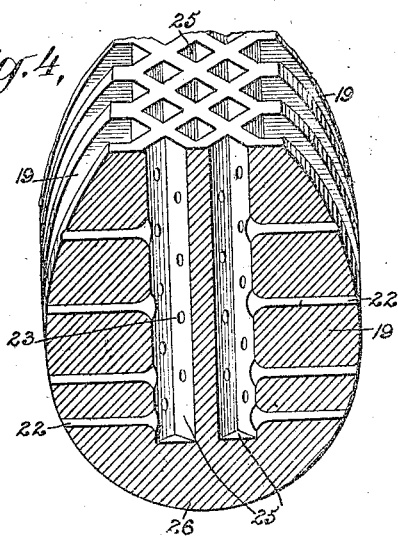
Fig. 4 is a detail view in perspective showing a modified form of the filler.

In Fig. 4 of the drawings, a modified form of the invention is shown. The modification consists in providing vertically-arranged rectangular cells 25, the bottoms whereof are closed by a solid tread portion 26, which is molded integrally with the partition walls 19. Also the construction is modified by providing three rows of the cells 25 disposed in staggered relation as shown best in Fig. 4, to replace the single line or row of perforations 21. The resulting structure of the filler is to produce an easier and more flexible cushion.

Figure 6:
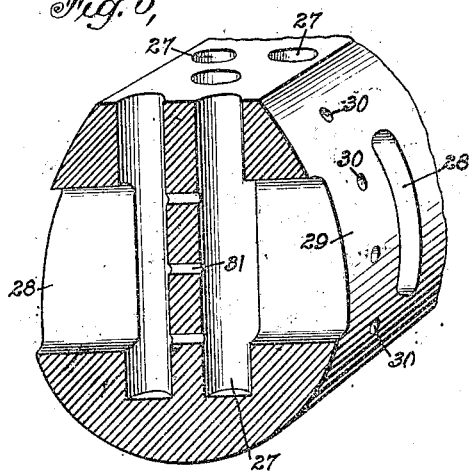
Fig. 6 is a detail view in perspective showing a modified form of the filler.

In the modified form shown in Fig. 6 of the drawings, a triple row of circular cells 27 is used to replace the rectangular cells 25 shown in Fig. 4. Laterally opening channels 28 are formed in an otherwise solid filler. The channels 28 communicate with the outer rows of cells 27. The inner or middle row of the cells 27 has lateral passages 30, which extend to the outer surface of the filler and are usually sealed by the shoe 15. Between the outer rows of the cells 27, short passages 31 are employed for equalizing the pressure on opposite sides of the tire and filler.

It is preferred when placing the filler in the shoe 15, to compress and bind the same in its compressed form prior to placing it in the shoe. After the proper disposition within the shoe has been effected, the material or device by which the binding is effected is removed and the filler is permitted to expand as far as the possibilities in this direction are afforded by the said shoe.

When the tire including the filler and shoe is to be placed on the wheel and within the rim 18, suitable means are employed for contracting the portion of the tire having the beads 16, so that the said beads may be placed within the channel formed by the said rim. When the beads have been disposed in service relation to the rim 18, the tire is released and the filler is permitted to expand the bead-bearing portion of the shoe to hold the tire on the rim 18.

Figure 5:
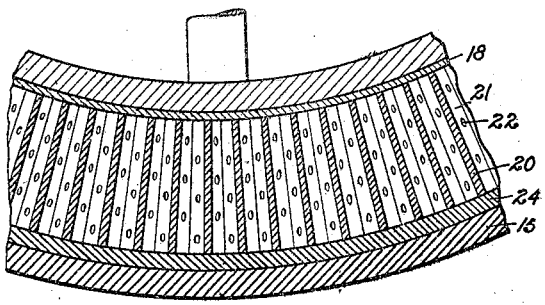
Fig. 5 is a longitudinal section on a reduced scale of the construction shown in Fig. 1 of the drawings, the section being taken as on the line 5—5 in Fig. 1.

The above-described operations of placing the filler in the shoe and of placing the shoe on the rim, are followed whether the filler be constructed in accordance with the preferred form shown in Figs. 1 to 3, inclusive, and in Fig. 5, or in the modified forms shown in Figs. 4 and 6.

*Claims.*

1. A tire filler comprising a resilient ring-like body, said body having a web portion disposed in the median plane of said body; a plurality of laterally-extended partition walls, the edges of said walls being constructed to conform to the inner shape of a tire shoe, said walls forming air pockets in conjunction with said tire shoe; and means for augmenting the resiliency of said body, said means embodying a plurality of radially-disposed passages in said web portion, the inner ends of said passages being closed by the tire rim.

2. A tire filler comprising a resilient ring-like body, said body having a web portion disposed in the median plane of said body; a plurality of laterally-extended partition walls, the edges of said walls being constructed to conform to the inner shape of a tire shoe, said walls forming air pockets in conjunction with said shoe; means for augmenting the resiliency of said body, said means embodying a plurality of radially-disposed passages in said web portion, the inner ends of said passages being closed by the tire rim; and means embodying a plurality of constricted passages operatively connecting said first-mentioned passages for equalizing the distribution of air into said passages.

EDGAR T. REYNOLDS.